May 16, 1950 F. C. DEHN 2,507,892
GAS AND OIL SEPARATOR
Filed April 23, 1945 3 Sheets-Sheet 1
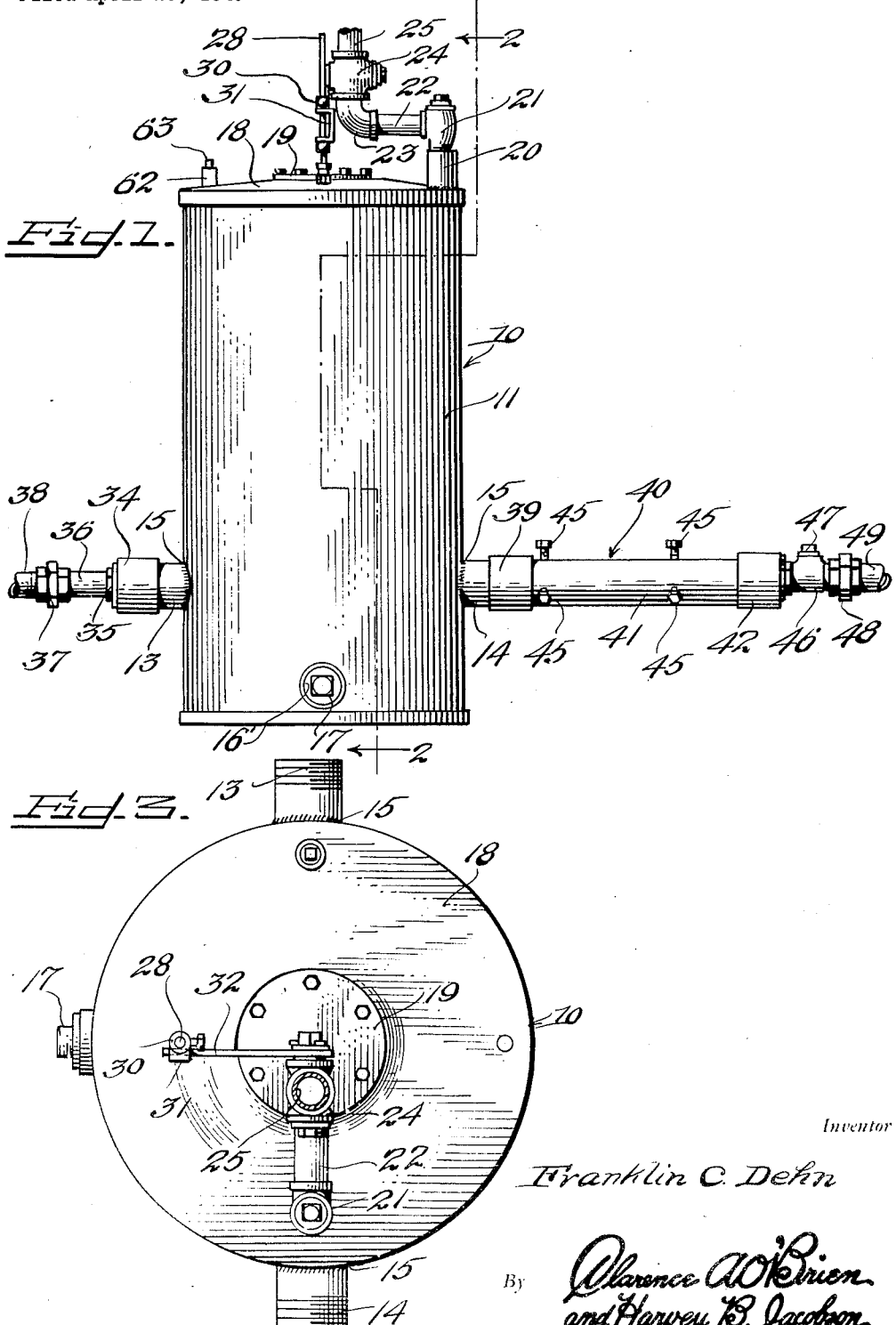
Inventor
Franklin C. Dehn
By Clarence A. O'Brien
and Harvey B. Jacobson
Attorneys

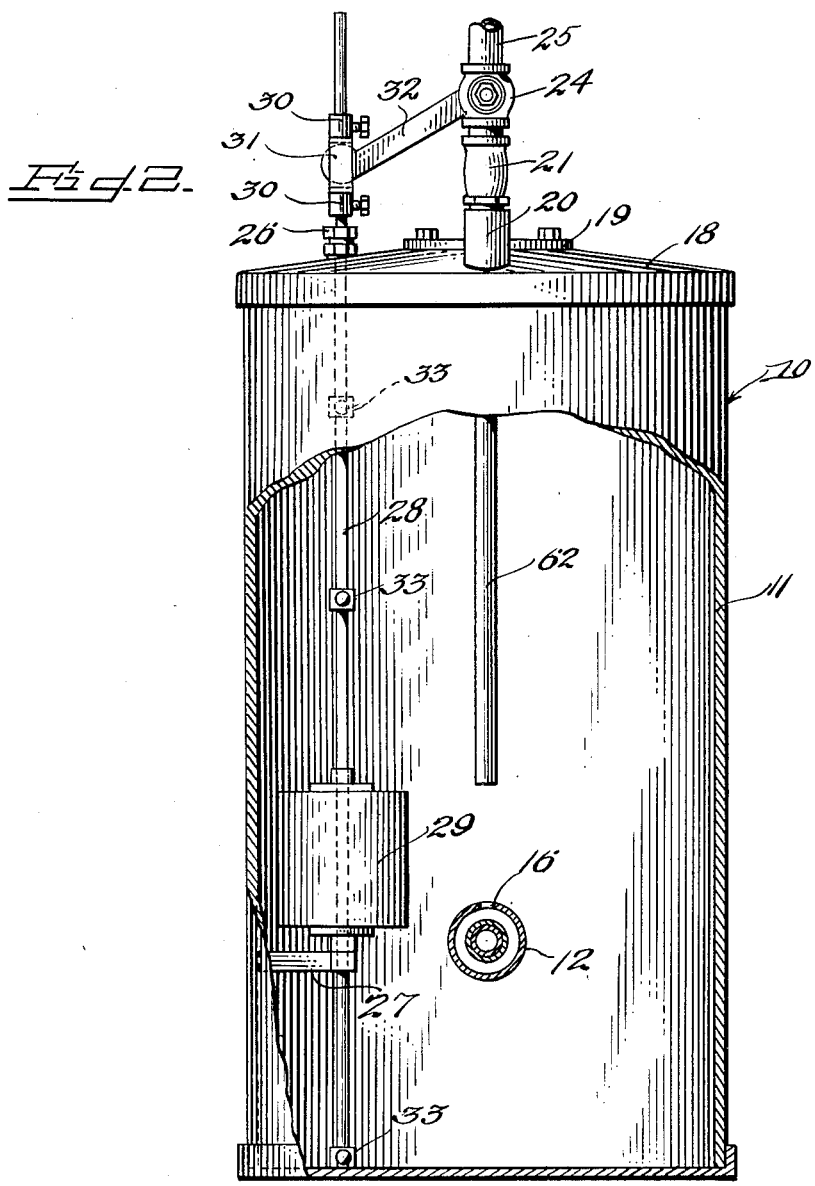

May 16, 1950 — F. C. DEHN — 2,507,892
GAS AND OIL SEPARATOR
Filed April 23, 1945 — 3 Sheets-Sheet 3
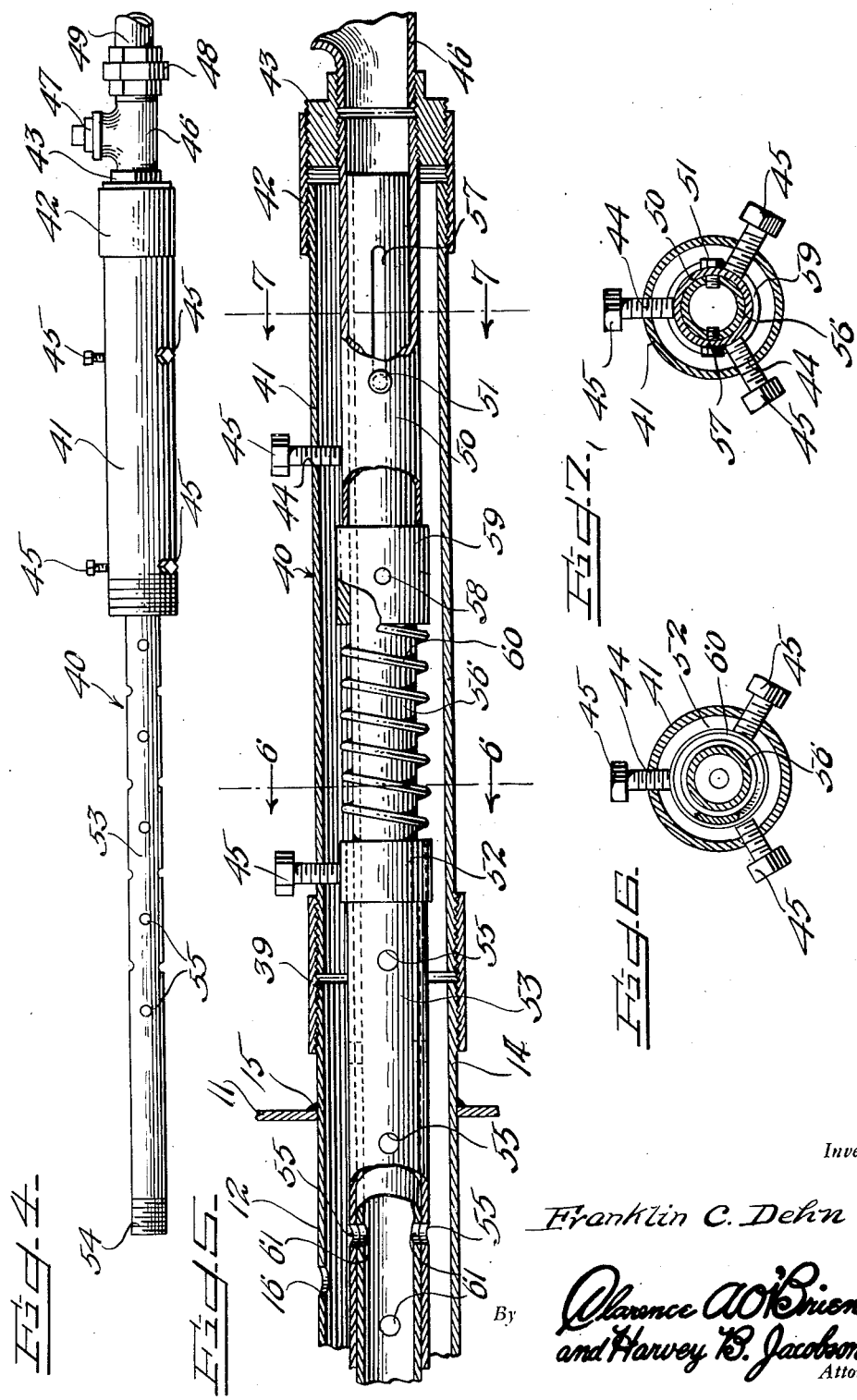
Inventor
Franklin C. Dehn
By Clarence A. O'Brien
and Harvey B. Jacobson
Attorneys Patented May 16, 1950

2,507,892

UNITED STATES PATENT OFFICE 2,507,892

GAS AND OIL SEPARATOR

Franklin C. Dehn, Bradford, Pa.

Application April 23, 1945, Serial No. 589,858

5 Claims. (Cl. 183—2.7)

This invention relates to improvements in the separation of gas from the liquid and solid contents of oil flowing from a well to a storage tank or the like.

A primary object of the invention is to trap the gas before it enters the oil storage tank and convey it to a gas storage tank or point of consumption where it can be utilized for some useful purpose.

Another object of the invention is to facilitate the clearing of a lead line of deposits of sludge or paraffin which frequently builds up on the walls of such a lead line to such an extent as to materially interfere with the flow of the oil through the line and at times even to such a point as to completely plug the line with the result dangerous pressures are frequently built up in those parts of the lead line where such plugging takes place.

A still further object of the invention is to provide for the automatic shutting off of the gas discharge line from my improved oil and gas separator should sludge, water and the like collect within the separator in sufficient volume as to be likely to be discharged through the gas discharge line.

The above and other objects may be attained by employing this invention which embodies among its features a tank, the upper end of which serves as a gas collecting reservoir while the lower end serves as a sludge trap, means operated automatically upon the collection of a predetermined volume of sludge in the bottom of the tank to shut off the discharge of gas from the upper part thereof, and an automatic valve interposed in the lead line and operating in conjunction with the tank to shut off the flow of fluid into the tank should a slug of paraffin or the like collect in the device to a point where the free flow of oil through the lead line is seriously impaired, and means for restoring the device to original operative relation after the slug has been discharged into the lead line.

In the drawings:

Figure 1 is a side view in elevation of an oil and gas separator embodying the features of this invention, Figure 2 is a vertical sectional view taken on the line 2—2 of Figure 1, Figure 3 is a top plan view of Figure 2, Figure 4 is a side view in elevation of the slug collecting and discharge valve, Figure 5 is an enlarged longitudinal sectional view of Figure 4, Figure 6 is a transverse sectional view taken on the line 6—6 of Figure 5, and Figure 7 is a transverse sectional view taken on the line 7—7 of Figure 5.

Referring to the drawings in detail, my improved gas saver generally designated 10 comprises a tank 11 which is pierced at diametrically opposite points near its lower end to receive a transversely extending pipe 12, opposite ends 13 and 14 of which project through the tank as illustrated in Figures 1 and 3. The junction of the pipe 12 with the tank is welded as at 15 to form fluid tank joints and formed at spaced intervals in the pipe within the tank 11 are openings 16, the purpose of which will be more fully hereinafter described.

Formed in the side of the tank near its lower end is a clean-out opening 16' which is closed by a plug 17 and the upper end of the tank is closed by a hood or a bonnet 18 which is formed with a central opening of relatively large diameter which is closed by a cover plate 19. Projecting upwardly from the bonnet 18 is an internally screw threaded socket 20 which communicates with the interior of the tank and receives a fitting 21 to which a pipe nipple 22 is attached. This nipple 22 is connected through an elbow 23 to a valve 24 which in turn is connected to the gas discharge line 25 which leads to a suitable gas receiver or tank not shown.

Mounted for vertical sliding movement through a stuffing box 26 in the hood or bonnet 18, and a guide 27 attached to the inner wall of the tank near its lower end, is a float rod 28 carrying a float 29 which as shown normally rests on the guide 27. Adjustably connected between collars 30 near the upper end of the float rod 28 is a yoke 31, in which is received the free end of a lever 32 carried by the turning plug of the valve 24. It will thus be seen that as the float 29 moves upwardly the float rod 28 will cause the yoke 31 to rise and this movement turns the valve plug of valve 24 to off position, thus interrupting the discharge of gas from the upper part of the tank 11 into the gas line 25. The float rod 28 is provided with adjustable stop collars 33 by means of which its vertical movement may be regulated.

Threaded on the end of the extension 13 of pipe 12 is a coupling socket 34 in the opposite end of which a bushing 35 is threaded. A nipple 36 is threaded into the bushing 35 and carries at its opposite end a union 37 by means of which the device is connected to the end of the lead line 38 which leads to the oil storage reservoir. The pipe end 14 carries a coupling socket 39 which serves as one of the coupling elements by which my improved automatic paraffin discharge unit designated generally 40 is connected to the tank 11.

The paraffin discharge unit 40 comprises a pipe length or nipple 41, one end of which is adapted to be threaded into the socket coupling 39 while its opposite end carries a socket coupling 42 into which a bushing 43 is threaded. The pipe length or nipple 41 is provided at spaced intervals intermediate its ends with radial openings 44 for the reception of cap screws 45, the purpose of which will later appear. Threaded into the outer end of the bushing 43 is a service T 46 one leg of which is closed by a plug 47 while the opposite leg is connected to a union 48 by means of which the unit is connected to the feeding end of the lead line 49. Threaded into the inner end of the bushing and extending into the pipe length 41 is a pipe length 50. The inner end of which is supported by one set of radial cap screws 45 as illustrated in Figure 5. Extending radially inwardly from the outer wall of the pipe 50 at diametrically opposite points are cap screws 51 forming guide studs for a purpose to be more fully hereinafter described. As shown, these studs are arranged in diametrically opposite relation. Adjustably supported on the inner ends of cap screw 45 near the end of the pipe length 41 opposite the coupling 42 is a collar 52 which is attached to one end of a pipe length 53 the opposite end of which is provided with external screw threads 54 for entry into the inner end of the bushing 35. As shown in Figures 4 and 5 the pipe length 53 is provided at spaced intervals with radial openings 55 the purpose of which will hereinafter appear.

Mounted for longitudinal sliding movement in the aligned pipe sections 50 and 53 is an inner pipe section or tubular member 56 which is provided near one end with a slot 57 in which the inner ends of the studs 51 are slidably received. Adjustably attached by a set screw 58 to the tubular member 56 is a collar 59 which serves as an abutment for one end of a compression coil spring 60 which encircles the tubular member 56 between the pipe sections 50 and 53. The end of the coil spring 60 opposite that which abuts the collar 59 bears against the collar 52 previously described as will be clearly seen upon reference to Figure 5. It will thus be seen that yielding pressure is exerted against the collars 52 and 59 so as to hold collar 59 against the inner end of the pipe section 50. Formed at spaced intervals in the tubular member 56 and normally aligning with the openings 55 in the pipe section 53 are openings 61 through which the gas contained within the oil flowing through the interior of the tubular member 56 is discharged into the pipe section 12 and thence through the openings 16 into the tank 11.

Alignment of the openings 55 and 61 is effected by loosening the set screw 58 and moving the collar longitudinally on the tubular member 56 until it is in such a position on the tubular member that when it butts the end of the pipe section 50 the openings will register.

So long as the openings 55 and 61 are aligned, oil, gas, water and sludge passing through the line will enter the tank 11, with the liquids and solids settling to the bottom thereof while the gaseous products will fill the upper portion thereof. Should the volume of liquid and sludge build up to a point where it encounters the float 29, the latter will rise and shut off the valve 24 before any of the liquid can be discharged through the gas discharge line 25.

Should a slug of paraffin moving toward the discharge end of the oil line encounter one of the separators, it will pass harmlessly therethrough because the friction of the slug against the inner face of the wall of the tubular member 56 will cause the tubular member to move longitudinally against the pressure of the spring 60. The openings 55 and 61 will thus be thrown out of alignment and such action will prevent the escape of the oil and gas into the device until the slug has passed on down the line beyond the separator. As soon as the slug passes into the line beyond the separator, the spring 60 will restore the parts to their original position and the separator automatically will be returned to service.

Should the gas pocket in the system obstruct the flow of fluid from the gas and oil separator I find it desirable to introduce into the interior of the tank 11 a pipe or vent 62 which leads upwardly through the cap or bonnet 18 and is normally closed by a plug 63.

While in the foregoing there has been shown and described the preferred embodiment of this invention it is to be understood that minor changes in the details of constructions, combination, and arrangement of parts may be resorted to without departing from the spirit and scope of the invention as claimed.

Having now described my invention that which I claim as new and desire to procure by Letters Patent is:

1. A gas and liquid separator adapted to be introduced into the lead line leading from an oil well to a storage receptacle, said separator including a tank, a perforated pipe extending through the tank near its lower end, opposite ends of the pipe being connected to the lead line, a perforated pipe section extending through the perforated pipe in spaced concentric relation thereto and immovable therein a perforated tube slidably fitted within the pipe section, the perforations of which normally align with those in the pipe section to admit fluid to the tank, said tube moving longitudinally in the pipe section to close the perforations therein during the period that a solid resists movement through the tube.

2. A gas and liquid separator adapted to be introduced into the lead line leading from an oil well to a storage receptacle, said separator including a tank, a pipe extending through the tank near its lower end, opposite ends of the pipe being connected to the lead line, said pipe having perforations communicating with the interior of said tank, first and second pipe sections in said pipe terminating in spaced relation and communicating with the lead line, fluid-tight seals between said pipe sections and the opposite ends of said pipe, said pipe sections being in spaced concentric relation with said pipe, said first section being perforated, a tube slidably fitted in said pipe sections and having perforations normally registering with those in said first pipe section to admit fluid to the tank, said tube moving longitudinally in the pipe sections to close the perforations in the first section during the period that a solid resists movement through the tube, and spring means surrounding the tube between said pipe sections yieldingly urging the tube into position opening the perforations in said first pipe section.

3. The combination of claim 2 including a radially inwardly extending guide stud in one of said pipe sections, said tube having a longitudinal slot slidingly and guidingly receiving said guide stud.

4. A gas and oil separator adapted to be introduced into the lead line leading from an oil well to a storage receptacle, said separator including a tank, a perforated pipe extending through the lower end of the tank and having one end connected to the lead line, a tube slidably fitted into said perforated pipe, said tube being connected to the lead line with a fluid-tight seal therebetween, said tube having perforations normally aligned with those of the perforated pipe to admit fluid to the tank, said tube moving longitudinally in the perforated pipe to close the perforations therein during the period that a solid resists movement through the tube.

5. A gas and liquid separator adapted to be introduced into the lead line leading from an oil well to a storage receptacle, said separator including a tank, a perforated pipe extending through the tank near its lower end, opposite ends of the pipe being connected to the lead line, a tubular valve within said pipe normally allowing the discharge of the contents of the lead line through the perforations in the pipe into the tank, said valve comprising a perforated pipe section extending through the perforated pipe in spaced concentric relation thereto and immovable therein, a perforated tube slidably fitted within the pipe section, the perforations of the tube normally aligning with those of the pipe section to admit fluid to the tank, said tube moving longitudinally in the pipe section to close the perforations therein during the period that a solid resists movement through the tube, and means automatically to return the tube to its normal position after the passage of a solid therethrough.

FRANKLIN C. DEHN.

REFERENCES CITED

The following references are of record in the file of this patent:

UNITED STATES PATENTS

| Number | Name | Date |
|---|---|---|
| 383,674 | Stuart | May 29, 1888 |
| 815,268 | Covell | Mar. 13, 1906 |
| 1,350,576 | Smith | Aug. 24, 1920 |
| 1,452,549 | Conrader | Apr. 24, 1923 |
| 2,253,939 | Scott-Paine et al. | Aug. 26, 1941 |
| 2,277,100 | Hartmann | Mar. 24, 1942 |